United States Patent [19]

Burke

[11] Patent Number: 5,015,384
[45] Date of Patent: May 14, 1991

[54] ANAEROBIC DIGESTION PROCESS

[76] Inventor: Dennis A. Burke, 2102 Lashi St., Olympia, Wash. 98503

[21] Appl. No.: 445,918

[22] Filed: Dec. 4, 1989

Related U.S. Application Data

[63] Continuation of Ser. No. 198,332, May 25, 1988, abandoned.

[51] Int. Cl.⁵ .................................................. C02P 3/28
[52] U.S. Cl. .................................. 210/603; 210/608; 210/704
[58] Field of Search ............... 210/603, 608, 616, 617, 210/221.2, 703, 704, 705, 706, 707

[56] References Cited

U.S. PATENT DOCUMENTS

| 2,324,400 | 7/1943 | Kelly et al. | 210/703 |
| 2,638,444 | 5/1953 | Kappe | 210/603 |
| 2,777,815 | 1/1957 | Forrest | 210/603 |
| 2,786,029 | 3/1957 | Lamb et al. | 210/603 |
| 4,067,801 | 1/1978 | Ishida et al. | 210/603 |
| 4,134,830 | 1/1979 | Skogman et al. | 210/603 |
| 4,297,216 | 10/1981 | Ishida et al. | 210/603 |
| 4,452,699 | 6/1984 | Suzuki et al. | 210/608 |
| 4,460,470 | 7/1984 | Reimann | 210/608 |
| 4,511,370 | 4/1985 | Hunziker et al. | 210/603 |
| 4,530,762 | 7/1985 | Love | 210/603 |

FOREIGN PATENT DOCUMENTS

| 54-113955 | 9/1979 | Japan | 210/603 |
| 55-15279 | 4/1980 | Japan | 210/603 |
| 57-6988 | 2/1982 | Japan | 210/603 |
| 57-144099 | 9/1982 | Japan | 210/603 |

Primary Examiner—Peter Hruskoci
Assistant Examiner—Christopher Upton
Attorney, Agent, or Firm—Christensen, O'Connor, Johnson & Kindness

[57] ABSTRACT

An improved anaerobic digestion process for waste having concentrations of suspended solids therein including separating the solids containing active biomass from other digestion products through the use of an anoxic gas flotation separation process and recirculation of separated solids containing active biomass to the anaerobic digestion reactor to maintain high concentrations of anaerobic microorganisms within the reactor.

6 Claims, 2 Drawing Sheets

ANAEROBIC DIGESTION PROCESS

This application is a continuation application based on prior copending application Ser. No. 07/198,332, filed on May 25, 1988, now abandoned.

BACKGROUND OF THE INVENTION

1. Field of the Invention

This invention relates to improved processes for anaerobic digestion of waste materials, and particularly waste materials including significant concentrations of solid material. The invention combines anaerobic treatment techniques with novel anoxic gas flotation processes for separating solids from liquids in the digested waste. The operating efficiency of the process is substantially improved as a result of recirculation of solids containing living anaerobic microorganisms or "biomass" to the anaerobic digester to maintain high concentrations of anaerobic microorganisms therein thus speeding the breakdown of organic compounds to water, methane gas, and other products of anaerobic digestion.

2. Description of Related Art

The anaerobic digestion process has been utilized to treat and remove organic compounds from waste products such as sewage, sewage sludge, chemical wastes, food processing wastes, agricultural residues, animal wastes, including manure and other organic waste and material. As is well known, organic waste materials are fed into an anaerobic digestion reactor or tank which is sealed to prevent entrance of oxygen and in these airfree or "anoxic" conditions, anaerobic bacteria digests the waste. Anaerobic digestion may be carried out in a single reactor or in multiple reactors of the two-stage or two-phase configuration. See, S. Stronach, T. Rudd & J. Lester, *Anaerobic Digestion Processes in Industrial Wastewater Treatment*, 1986, Springer, Verlag, pp. 93-120 for single reactors and pp. 139-147 for multistage operations. Heat is normally added to the reactor or reactors to maintain adequate temperatures for thermophilic or mesophilic bacteria which accomplish the breakdown of the organic material. Mixing of the wastes by either mechanical or gas recirculation is normally provided to accelerate digestion.

The products or effluent from anaerobic digestion consist of: (1) a gas phase containing carbon dioxide, methane, ammonia, and trace amounts of other gases, such as hydrogen sulfide, which in total comprise what is commonly called biogas; (2) a liquid phase containing water, dissolved ammonia nitrogen, nutrients, organic and inorganic chemicals; and (3) a colloidal or suspended solids phase containing undigested organic and inorganic compounds, and synthesized biomass or bacterial cells within the effluent liquid. The liquid phase (2) and the solid phase (3) comprise the effluent mixed liquor from the digestion reactor.

The importance of maintaining high concentrations of anaerobic microorganisms or biomass within the anaerobic digestion reactor has long been recognized. The anaerobic bacteria are responsible for the breakdown or degradation of organic compounds to water, methane gas, and other products of anaerobic digestion. The greater the concentration of these bacteria the more rapid and efficient the process of digestion. This has lead to the use of anaerobic filters which maintain an active biomass attached to inert particles within the anaerobic reactor. See, Midwest Plan Service, *Livestock Waste Management With Pollution Control*, 1975. Immobilized biomass within ceramic materials has also been used to attempt to accomplish this goal. See, S. Stronach, T. Rudd & J. Lester, *Anaerobic Digestion Processes in Industrial Waste Water Treatment*, 1986, Pub. Springer, Verlag, p. 145.

Maintaining a high biomass or bacterial population within the anaerobic reactor results in significantly reduced reactor detention time and thus smaller reactor size. Reduction of reactor size results in a reduction in capital costs, as well as energy requirements for heating and mixing of the reactor. Maintaining a high biomass also increases the treatment efficiency since the larger bacterial population reduces or breaks down more of the organic material being processed. Higher treatment efficiencies cause the generation of a greater amount of methane gas. Higher treatment efficiencies also result in a cleaner liquid effluent which can be disposed of more economically and a reduced volume of solids within the effluent which reduces the quantity of material to be transported to an ultimate disposal site. In addition, higher treatment efficiencies or greater destruction of organic compounds, render the solid and liquid effluent more amiable to separation of valuable resources within the effluents such as heavy metals and nutrients such as ammonia nitrogen.

Maintaining a high biomass concentration has also been recognized as providing a more stable anaerobic digestion environment since the high concentration of bacteria are less likely to be influenced to a great extent by minor changes in temperature, pH, and other environmental reactor conditions. See, S. Stronach, T. Rudd & J. Lester, *Anaerobic Digestion Processes in Industrial Wastewater Treatment*, 1986, Springer, Verlag, pp. 136-138.

As stated previously, anaerobic filters, sludge blanket anaerobic reactors, or encapsulated bacteria in ceramic material of various types maintain high biomass concentrations and thus are able to achieve the benefits listed above when treating certain types of waste products. See, Midwest Plan Service, *Livestock Waste Management With Pollution Control*, 1975. However, these processes cannot be utilized in the processing of waste containing significant concentrations of suspended solids or colloidal material since such solids will plug the filters and/or porous medium.

In order to overcome the inadequacies of anaerobic filters and encapsulated bacterial retention systems in treating organic materials with suspended solids content, the prior art has identified the use of the so-called anaerobic activated sludge process, which has also been called the anaerobic contact process. See, S. Stronach, T. Rudd & J. Lester, *Anaerobic Digestion Processes in Industrial Wastewater Treatment*, 1986, Springer, Verlag, pp. 93-120, 136-147. The anaerobic activated sludge process is similar to its aerobic counterpart, the aerobic activated sludge process, which is commonly used to treat industrial and municipal wastes aerobically, i.e., using air with oxygen. Fair, Geyer & Okun, *Water Purification and Wastewater Treatment and Disposal*, Vol. 2, 1968; U.S. Environmental Protection Agency, *Process Design Manual for Suspended Solids Removal*, 1975, pp. 7-23 through 7-29.

The aerobic activated sludge process consists of an aerobic reactor wherein a mixed liquor of influent waste and recirculated sludge or microorganisms are maintained under aeration followed by a liquid/solids separator which separates the suspended solids and microorganisms for recycle to the aerobic reactor. The effluent from the liquid/solids separator is substantially free of suspended solids and the vast majority of the influent organic wastes.

The aerobic activated sludge process is commonly utilized as a waste treatment process because it can achieve high degrees of organic waste removal in small reactors containing high concentrations of microorganisms or biomass. High biomass concentrations are maintained by recirculating the solids from a liquid/solids separator. Although many liquid/solids separating processes are available, gravity separation or gravity clarification are primarily utilized. Fair, Geyer & Okun, *Water Purification and Wastewater Treatment and Disposal*, Vol. 2, 1968, pp. 35-17 through 35-22. Vacuum flotation and dissolved air flotation has also been utilized. U.S. Environmental Protection Agency *Process Design Manual for Suspended Solids Removal*, 1975, pp. 7-23 through 7-27.

The anaerobic activated sludge, or anaerobic contact process, has not been effectively utilized because the bacteria in anaerobic digestion are not easily separated from the mixed liquor effluent. The difficulty has been that actively fermenting organisms do not settle by gravity because of the buoying effects of attached gas bubbles and the fact that the density of the bacteria closely approximate the density of water and do not floc easily. The use of other common liquid/solids separators also have disadvantages. The use of gravity clarification with the addition of high concentrations of flocculating or coagulating chemicals is expensive and harmful to the bacteria. Rapid temperature and pH changes have also been attempted and found to be harmful to the bacteria. Centrifuging has been found to be expensive and detrimental to the bacteria. Conventional dissolved air flotation as well as froth and foam flotation techniques are detrimental to the anaerobic bacteria since even minute amounts of oxygen or air are sufficient to destroy the bacteria. S. Stronach, T. Rudd & J. Lester, *Anaerobic Digestion Processes in Industrial Wastewater Treatment*, 1986, Springer, Verlag, pp. 35-38.

BRIEF SUMMARY OF THE INVENTION

This invention provides an improved anaerobic digestion process suitable for use with waste having concentrations of solid materials therein and includes the use of a gas flotation liquid/solids separation technique employing oxygen-free, i.e., anoxic gas. The separated solids which are rich in active biomass are then recirculated to the anaerobic digestion reactor to maintain a high concentration of anaerobic microorganisms within the digestion reactor.

DETAILED DESCRIPTION OF THE INVENTION

Figure 1:
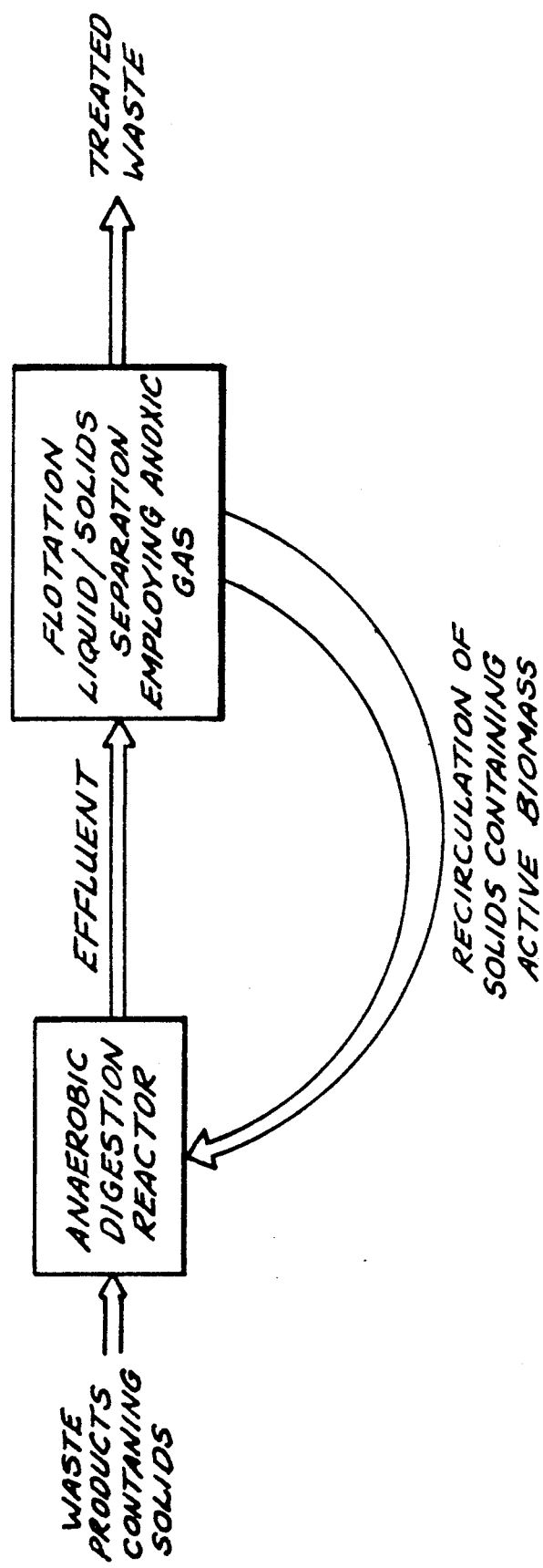
FIG. 1 is a block diagram illustrating the steps of the improved anaerobic digestion process.

In accordance with the present invention, an improved anaerobic digestion process is disclosed wherein anoxic gas such as digester gas, biogas, or its carbon dioxide or methane components generated by the anaerobic digestion process are utilized in known gas flotation separation equipment for the purpose of separating solids from liquids in the effluent of the anaerobic digester. The separated solids which are rich in biomass are then recirculated, at least in part, to the anaerobic digester to enrich the concentration of anaerobic microorganisms therein. See FIG. 1. Separation of solids from liquids by anoxic gas flotation may be accomplished by any of a number of known techniques including dissolved gas flotation, dispersed gas flotation, vacuum gas flotation, froth flotation, or foam flotation, either separately or in combination with each other.

Figure 2:
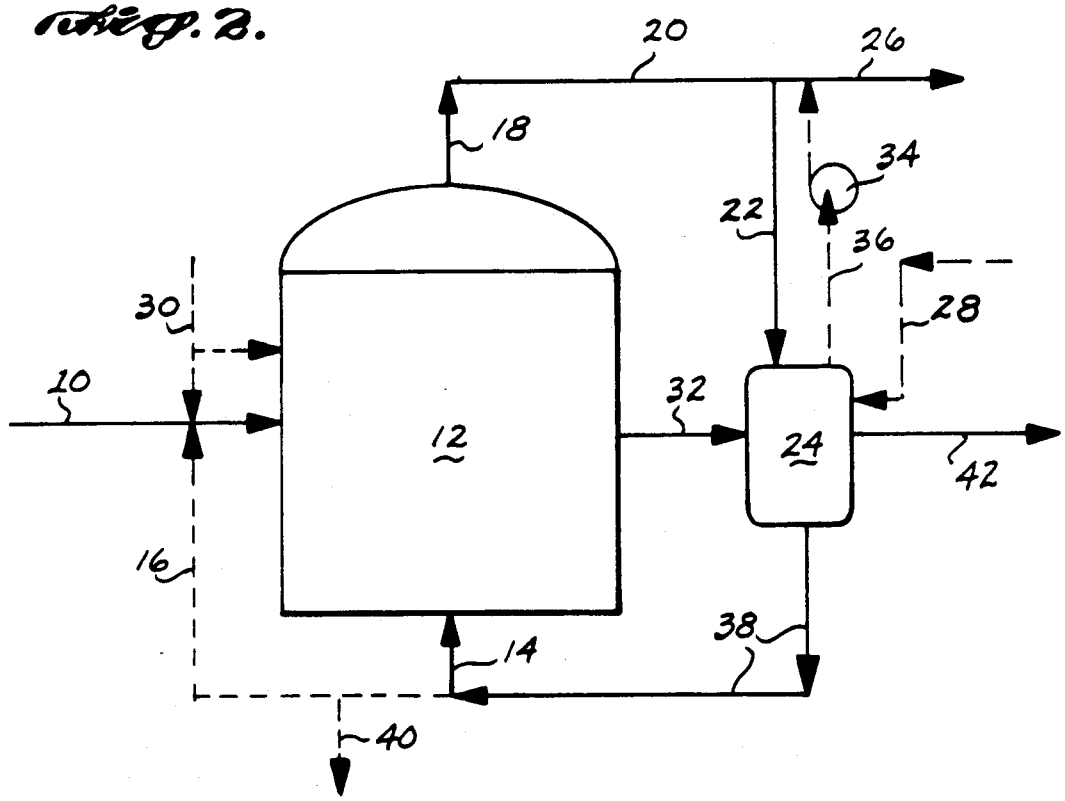
FIG. 2 is a schematic illustration of one embodiment of the present invention, the dashed lines illustrating alternative embodiments.

Referring now to FIG. 2, a preferred embodiment of the present invention is disclosed. It will be understood that FIG. 2 is a schematic representation of the process steps of this invention with lines and arrows representing piping or other suitable transport means for waste, gases, and effluent. Conventional mass transport devices such as pumps and normally utilized appurtenances such as retention tanks and chemical feed systems are not illustrated since such are well known in the art and can be readily utilized where needed by a man skilled in the art.

Influent organic waste is delivered via line 10 to a conventional anaerobic digestion reactor 12. The organic feed may be any organic material or waste product for which treatment is desired or from which methane gas energy is to be derived. Anaerobic digester reactor 12 contains anaerobic bacteria, the influent wastes, and, as will be discussed hereafter, recycled solids containing active biomass. The active biomass is delivered to the reactor via line 14, or in the alternative by way of line 16 to the influent at line 10.

The anaerobic digester 12 may be heated or unheated. If heated, it may be operated in a temperature range at which mesophilic or thermophilic bacteria thrive. The digester 12 may be of any commonly utilized configuration and is not limited by construction materials. The digester 12 may be mixed or unmixed during processing. If mixed, it can be mixed mechanically or with a recirculated natural gas mixing system or any other commonly utilized mixing scheme well known in the art. While digester 12 is shown to be a single reactor in FIG. 2, it will be understood that multiple reactors, parallel digestion, staged digestion, phased digestion, or carrier-assisted digestion, all of which equipments and techniques are well known in the art, may alternatively be used and are considered to be within the scope of this invention.

Biogas containing methane, carbon dioxide, ammonia, and other trace gases such as hydrogen sulfide is discharged from reactor 12 as a result of normal upward flow, pressurization of the reactor, vacuum pump, blower, or other conventional means through outlet piping 18 and along line 20. A portion of the biogas may be transported along piping represented by line 22 and utilized in the flotation liquid/solids separator 24. The remaining biogas is transported along line 26 and may be utilized directly by a boiler, engine generator, or cleaned up to produce pipeline quality gas or placed to some other productive use.

In the alternative, it will be understood that other anoxic gases may be utilized by the gas flotation separator unit 24. Such gases may be delivered to unit 24 along piping represented by lines 28. The source of the other anoxic gases may be from the cleanup and gas separation of gases discharged along line 26, effluent gases from an engine generator and/or boiler utilizing the biogas transported along line 26, and/or any other external source of gas. The primary requirement is that the gas be anoxic, i.e., not contain oxygen or other constituents toxic to the anaerobic bacteria.

In still another alternative, a suspended particle carrier may be added to the influent at line 10 or directly to the anaerobic digester 12 via lines 30. The purpose of the carrier being to provide a medium on which anaerobic bacteria will attach and thus be more easily removed in the liquid/solids separator 24.

The anaerobic digester effluent containing water; dissolved ammonia nitrogen; phosphate and other nutrients; dissolved organic and inorganic chemicals; colloidal or suspended solids consisting of undigested organic and inorganic compounds and synthesized biomass or bacterial cells either attached or unattached to a suspended particle carrier is delivered along line 32 to the flotation liquid/solids separator 24.

The flotation liquid/solids separator 24 may be of a variety of types and configurations which commonly utilize air as a flotation gas and are known to those skilled in the art. They include: (1) dissolved gas flotation with or without recirculation; with or without polymer, flocculation or coagulant additions; with or without a retention or holding tank and with or without mechanical collection of the solids float; (2) dispersed air flotation wherein gas bubbles are created by mechanical agitation; (3) foam or froth flotation wherein bubbles are created by mechanical means or dissolving the gas under pressure with the addition of foaming or frothing chemical agents to promote the attachment of solids to the gas bubbles; and (4) modified dissolved gas flotation which takes advantage of the small gas bubbles existing within the effluent.

Other alternative forms of liquid/solids separation are also contemplated as usable in this invention. They include vacuum flotation wherein less than atmospheric pressure is applied to the flotation device 24 which thus allows dissolved biogases found in the anaerobic digester effluent to precipitate and form small gas bubbles capable of floating the solids. In this embodiment, a vacuum-creating device 34 is shown as removing the released gases via line 36.

While the many alternative devices and techniques described above have been commonly utilized with air as a flotation gas, a novel feature of the present invention is that these devices or systems are contemplated as being used with anoxic gas. Biogas generated in the anaerobic digestion reactor 12, its component gases methane and/or carbon dioxide and/or any other anoxic gas may be utilized, in accordance with the present invention, as a flotation gas in the liquid/solids separation unit 24 to accomplish separation of solids without damage to the active biomass contained within the solids.

As illustrated in FIG. 2, the solids portion emanating from the liquid/solids separator 24 and containing active biomass is transported along line 38 and thence to the anaerobic digestion reactor along line 14 or to the influent line 10 via line 16. Alternatively, the solids may be transported for waste byproduct extraction and cleanup or external recirculation, as is known in the art, and as represented by line 40. The effluent from the liquid/solids separator 24 is transported along line 42 to ultimate disposal or other resource recovery processes known in the art.

Referring now to FIG. 3, it will again be understood that conventional mass transport devices such as pumps and dissolving or retention vessels, while not illustrated, are contemplated as forming a part of the disclosure of the present invention. In addition, the location of the transport lines in both FIGS. 2 and 3 are for illustrative purposes only and it will be understood that such lines could be run along other suitable paths so long as the materials are transported to the desired locations.

Figure 3:
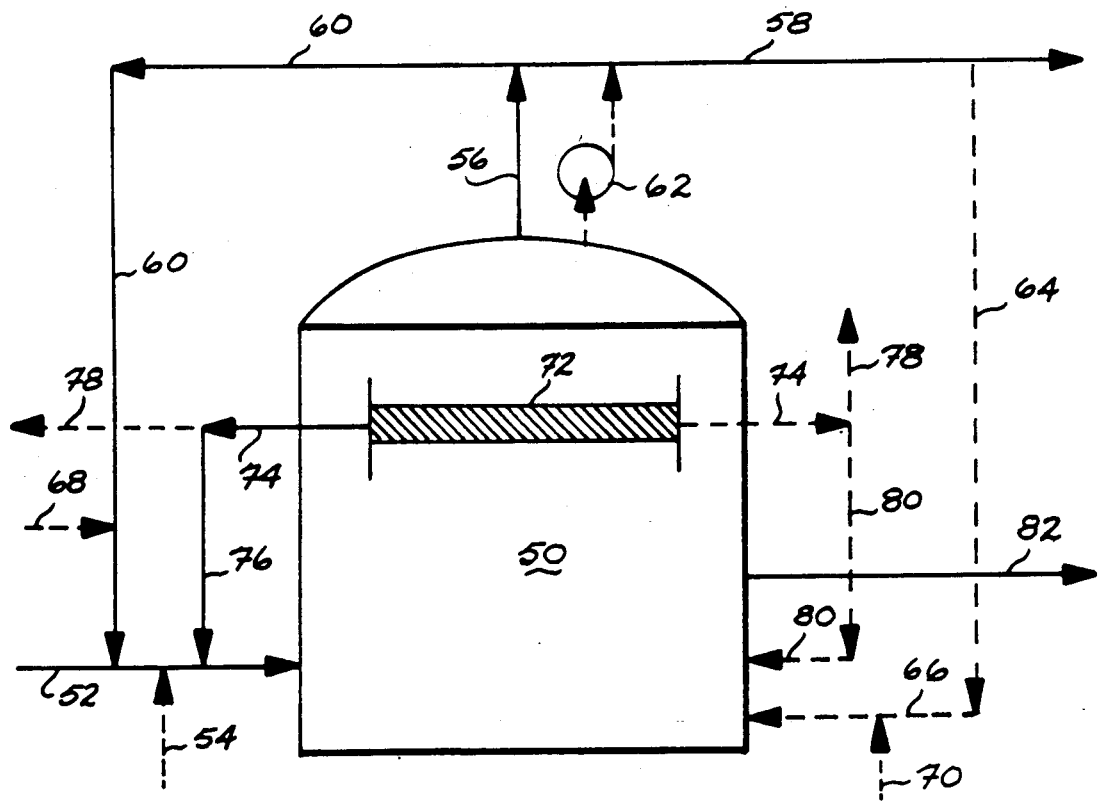
FIG. 3 is another embodiment of the present invention wherein the liquid/solids separation and anaerobic digestion takes place within the same reactor, the dashed lines indicating alternative embodiments.

In the alternative embodiment illustrated in FIG. 3, the liquid/solids separation and anaerobic digestion is carried out within a single anaerobic reactor vessel 50. The influent organic waste material is transported to the reactor along piping represented by line 52. As was discussed above, a suspended particle carrier may be added, if desired, via piping represented by line 54. However, such addition is not necessary. The reactor 50 may be of any size, shape, or configuration. It may be heated or unheated, mixed or unmixed and constructed of any of a variety of construction materials known in the art. The reactor 50 may be preceded by or followed by other anaerobic reactors in a multiple stage or multiple phase configuration as is conventionally known.

Biogas extracted from the reactor in any of the known manners discussed above, is transported along line 56 and thence via line 58 to productive use, cleanup, or separation to its various anoxic components. A portion of the biogas produced through anaerobic digestion may be recycled along line 60 to waste influent line 52 for gas liquid/solids separation purposes. In the alternative, a vacuum pump or blower 62, may be incorporated to assist in the gas liquid/solids separation. In still another alternative, a portion of the biogas produced may be withdrawn from line 58 and transported along lines 64 and 66 to the anaerobic digester 50. Influent liquid in line 52 or effluent liquid in line 82 may be added to biogas lines 60 and 64 and the contents pressurized for dissolved gas flotation. In still another alternative, other anoxic gases may be utilized in this process and can be added to the system through suitable piping illustrated by lines 68 and 70.

Solids separated by the anoxic gas flotation process are illustrated as being collected at lined area 72 in FIG. 3. The separated solids containing active biomass are transported along lines 74 and 76 to the influent line 52 to provide additional biomass to the reactor for improved anaerobic digestion. In the alternative, separated solids may be transported from time to time via lines 74 and 78 out of the system for ultimate disposal, extraction of valuable resources, and/or other processing. In still another alternative, solids containing active biomass may be transported along lines 74 and 80 directly to the anaerobic reactor.

Foam, froth, flocculation, coagulation, or other chemical aids may be added to promote biogas liquid/solids separation via any of lines 52, 54, 76, 80, 60, 64, 66, 68, or 70.

The effluent from the reactor 50 containing few suspended solids is carried from the reactor along piping represented by line 82. As stated earlier, some of the effluent may be recycled and used in conjunction with the biogas in lines 60 or 64 for dissolved gas flotation purposes.

FIG. 3 thus illustrates the unique process whereby flotation liquid/solids separation is carried out within reactor 50 through the use of biogas, its component gases, and/or other anoxic gases and the total or partial recirculation of active biomass to promote rapid and efficient anaerobic digestion.

Obviously, other modifications and variations of the invention as hereinbefore set forth may be made without departing from the spirit and scope thereof, and only such limitations should be imposed as are indicated in the appended claims.

What is claimed is:

1. In a method of treating waste products containing suspended solids by an anaerobic digestion process within an anaerobic reactor and withdrawing an anoxic gas and treated effluent from said reactor, the improvement consisting essentially of:

conducting a separate gas flotation step on effluent from said reactor in a manner such that active biomass is substantially separated from the digester effluent, wherein said gas flotation employs an anoxic gas and a chemical aid to promote separation of said active biomass withdrawing an effluent from said gas flotation step, and then recirculating said separated active biomass to said anaerobic reactor to substantially increase the biomass within said anaerobic reactor, whereby the efficiency of the reactor is increased and the size of the reactor may be reduced.

2. The method of claim 1 wherein the separation of solids from liquids is carried out by the dissolved gas flotation process using anoxic gas.

3. The method of claim 1 wherein the separation of solids from liquids is carried out by the dispersed gas flotation process using anoxic gas.

4. The method of claim 1 wherein the separation of solids from liquids is carried out by the vacuum gas flotation process using anoxic gas.

5. The method of claim 1 wherein at least a portion of said gas withdrawn from said reactor is employed in said gas flotation process to separate solids from the reactor effluent.

6. A method of maintaining a high biomass concentration in a process of treating waste products containing suspended solids therein using an anaerobic digestion process, consisting essentially of:

digesting the waste products in an anaerobic reactor and withdrawing an anoxic gas and treated effluent from said reactor;

separating active biomass from the reactor effluent in a liquid/solid separator by means of a gas flotation process employing anoxic gas and further employing a chemical aid to promote separation of said active biomass, whereby said active biomass floats to the top of said separator withdrawing an effluent from said gas flotation step; and then recirculating the active biomass directly to the reactor, thereby maintaining a high concentration of active biomass in said reactor, such that the efficiency of the reactor is increased.

* * * * *